April 3, 1951     R. G. NILL ET AL     2,547,168
LAMINATED DIE

Filed Oct. 18, 1945     3 Sheets-Sheet 1

INVENTORS.
Richard G. Nill,
BY Frederick J. Patterson,

April 3, 1951 R. G. NILL ET AL 2,547,168
LAMINATED DIE
Filed Oct. 18, 1945 3 Sheets-Sheet 2
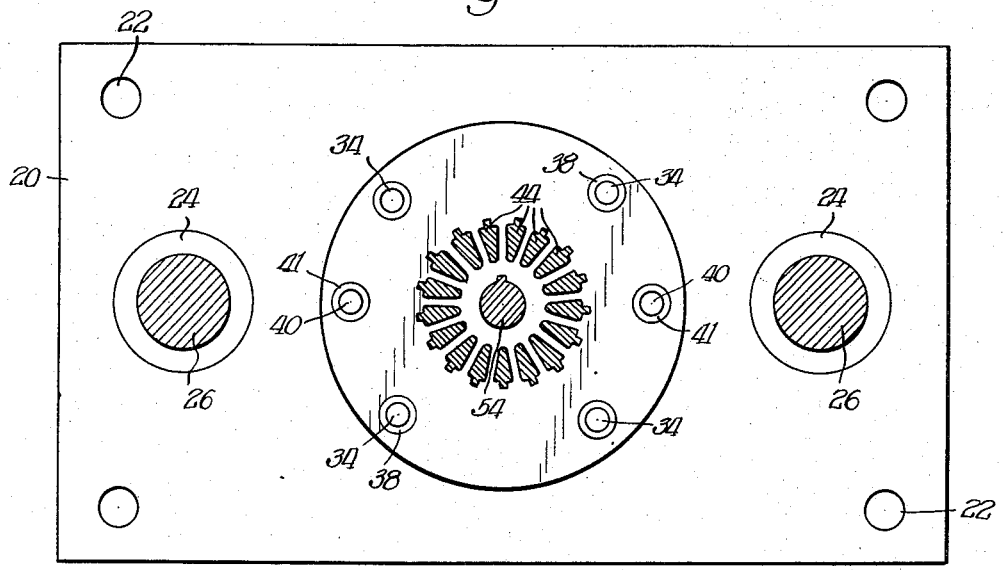
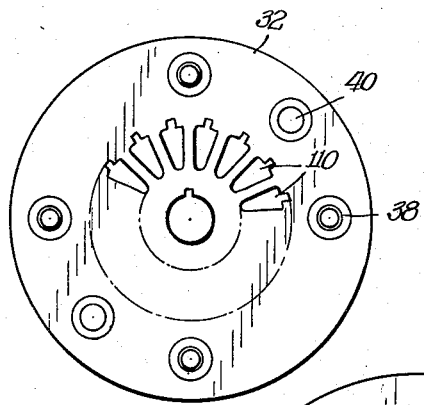
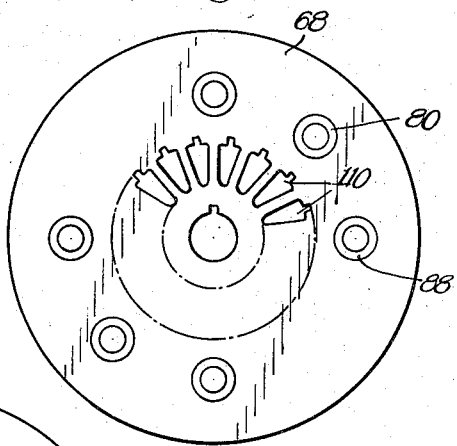
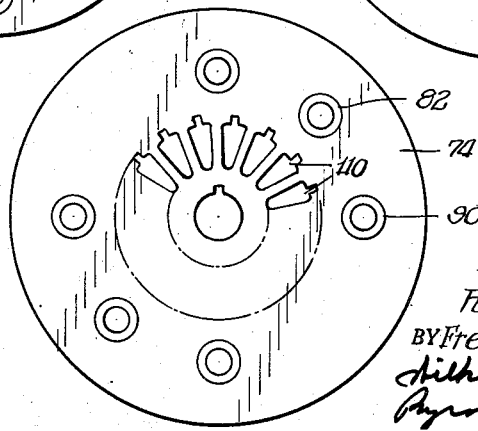
INVENTORS.
Richard G Nill,
BY Frederick J. Patterson,
ATTYS.

April 3, 1951 R. G. NILL ET AL 2,547,168
LAMINATED DIE
Filed Oct. 18, 1945 3 Sheets-Sheet 3
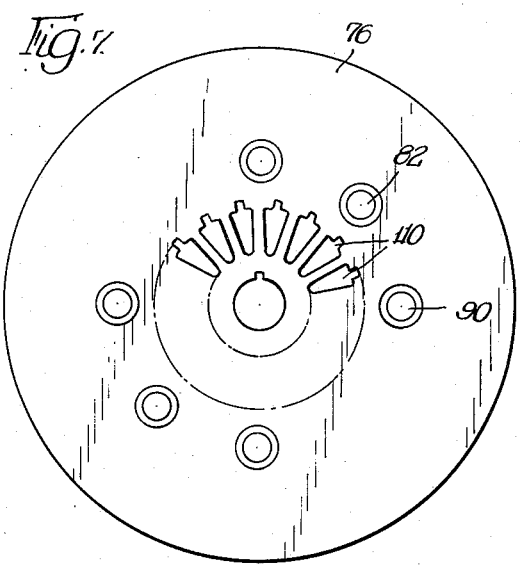
Fig. 7.
Fig. 8.
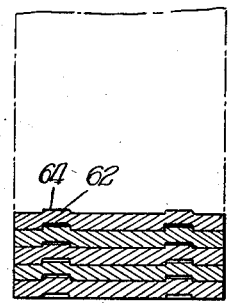
Fig. 10.
Fig. 9.
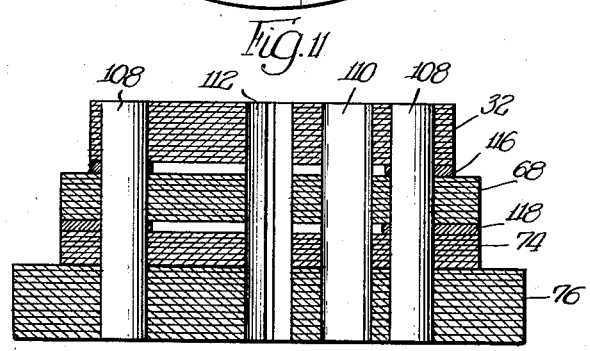
Fig. 11.
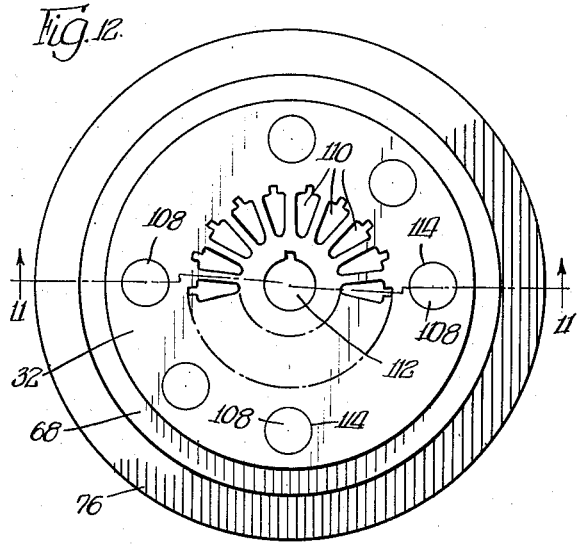
Fig. 12.
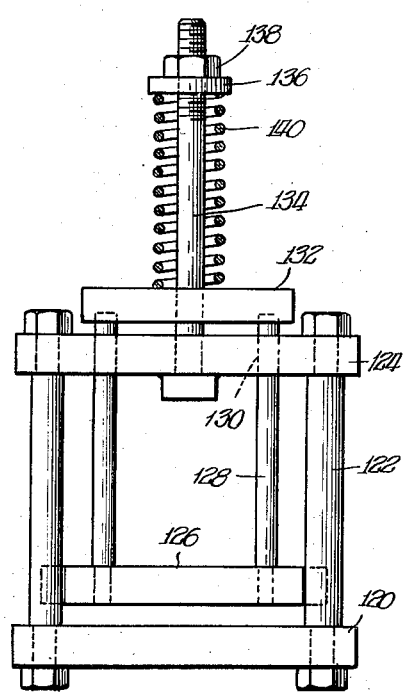
Fig. 13.
INVENTORS.
Richard G. Nill,
BY Frederick J. Patterson.
ATTYS Patented Apr. 3, 1951

2,547,168

UNITED STATES PATENT OFFICE 2,547,168

LAMINATED DIE

Richard G. Nill and Frederick J. Patterson, Fort Wayne, Ind., assignors to Fort Wayne Tool, Die and Engineering Company, Fort Wayne, Ind., a partnership Application October 18, 1945, Serial No. 623,034

27 Claims. (Cl. 164—29)

This invention pertains to a laminated die.

It is an object of this invention to provide a die which will have more die life than the now standard forms of dies, that is, one by which more blanks (work) may be produced per inch of die thickness.

Another object of the invention is to provide a die by the use of which better parts may be produced for the life of the die.

Another object of the invention is to provide a die so constructed and arranged that parts may be produced therefrom which will always be as accurate as though made from a new die. This is an advantage over the now standard dies, as the more a standard die is used, the more the work produced therefrom becomes inaccurate. The die which is the subject matter of this invention, has a longer die life, as it is not necessary to form it with back taper, such as must be formed in a standard die.

Another object of the invention is to provide a die so constructed and arranged that it will always be used with a punch of one size, that is, due to absence of back taper in the die, the hole does not get larger as the die is ground when sharpening, as it would when an ordinary die is sharpened, which would make it necessary to use an oversize punch.

Another object of the invention is to provide a die wherein a better die set can be made, and the parts, such as the parts of the die, can be readily replaced as it is found necessary, and the die need not be sharpened as much as in case of an ordinary die.

Another object of the invention is to provide a die assembly wherein perishable parts, as desired, can be furnished for repair.

Another object of the invention is to provide a laminated die so constructed and arranged that the parts thereof can be made by a machine using as few as a single punch, or other tool and die, by indexing the work.

Another object of the invention is to provide a laminated die so constructed and arranged that it is more easily assembled and the parts more easily secured together than the parts of a segmental die and wherein the die parts are more quickly, more easily and more accurately made than a file die.

Another object of the invention is to provide a laminated die so constructed and arranged that when assembled, openings therein need not be ground, but may be honed or lapped, and the material used to fasten the laminations together, such as brazing material, acts as a lubricant in the punch openings.

Another object of the invention is to provide a laminated die wherein the laminations are secured as by brazing and heat treating, in one step, and are then cooled, whereby distortion is reduced to a minimum, but in the event there is any distortion of the parts, it is uniform, so is self-compensating.

Another object of the invention is to provide a die which can be formed by a method which makes possible the ready formation of thick parts inasmuch as the laminations can be blanked, whereas in the instance of segmental or file dies the thick finished parts could not be blanked.

Another object of the invention is to provide a die which can be used where a multiplicity of similar pieces are to be blanked out, such as in the formation of parts for a motor, generator, a transformer, choke coil and other devices.

Another object of the invention is to provide a die which can be made more quickly than the now standard forms of dies, and consequently can be made more cheaply, particularly when more than one die is to be made, such as is the case with lamination dies.

Another object of the invention is to provide a die which can be made more uniformly as the parts thereof can be made from a master die.

Another object of the invention is to provide a die assembly wherein greater accuracy can be obtained between the component parts of the assembly, as the spider, stripper, die and die back up can be finished together.

Another object of the invention is to provide a die assembly wherein greater accuracy can be obtained between the component parts of the assembly, as the spider, stripper, die and die back up can be brazed and heat treated as a single unit and thereafter the parts can be separated as desired.

Another object of the invention is to provide a die wherein the component parts thereof can be repaired more easily as parts for duplicate dies can be made interchangeable as they are made from a master die.

Another object of the invention is to provide a die which can be made stronger than the now existing file dies or segmental dies.

Another object of the invention is to provide a die which when in existence can be used as a master die for duplicating that die, and so arranged that slight variations can be made therefrom.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 3 is a sectional bottom plan view of the upper portion of the die assembly illustrated in Figure 1, the same being taken substantially in the plane as indicated by the line 3—3 of Figure 1;

Figure 4 is a plan view of the punch pad or spider for the die assembly illustrated in Figures 1 to 3, inclusive;

Figure 5 is a plan view of the stripper and punch guide for the die assembly illustrated in Figures 1 to 3, inclusive;

Figure 6 is a plan view of the die for the die assembly illustrated in Figures 1 to 3, inclusive;

Figure 7 is a plan view of the die back-up plate for die assembly illustrated in Figures 1 to 3, inclusive;

Figure 8 is a side elevation of a form of laminated punch adapted for use in the die assembly illustrated in Figures 1 to 3, inclusive;

Figure 9 is an enlarged fragmentary, longitudinal sectional elevation of the laminated punch illustrated in Figure 8, showing positioning means between the laminations;

Figure 10 is a plan view of a punch lamination of the punch illustrated in Figure 8;

Figure 11 is a sectional elevation through certain of the die parts, showing the method of assembling the lamination die parts for brazing and heat treating, the same being taken substantially in the plane as indicated by the line 11—11 of Figure 12;

Figure 12 is a top plan view of assembly illustrated in Figure 11;

Figure 13 is an elevation of a form of fixture for holding die parts, substantially as those illustrated in Figures 11 and 12, whereby they may be brazed and heat treated;

Figure 1:
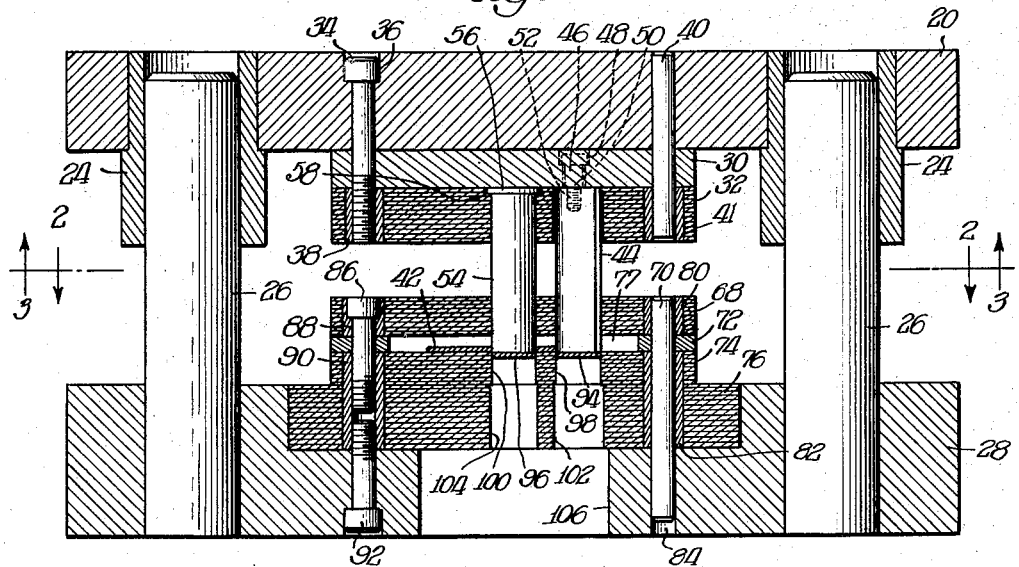
Figure 1 is a fragmentary sectional elevation through a die assembly embodying the invention, the section being taken substantially in the plane as indicated by the line 1—1 of Figure 2.
Figure 2:
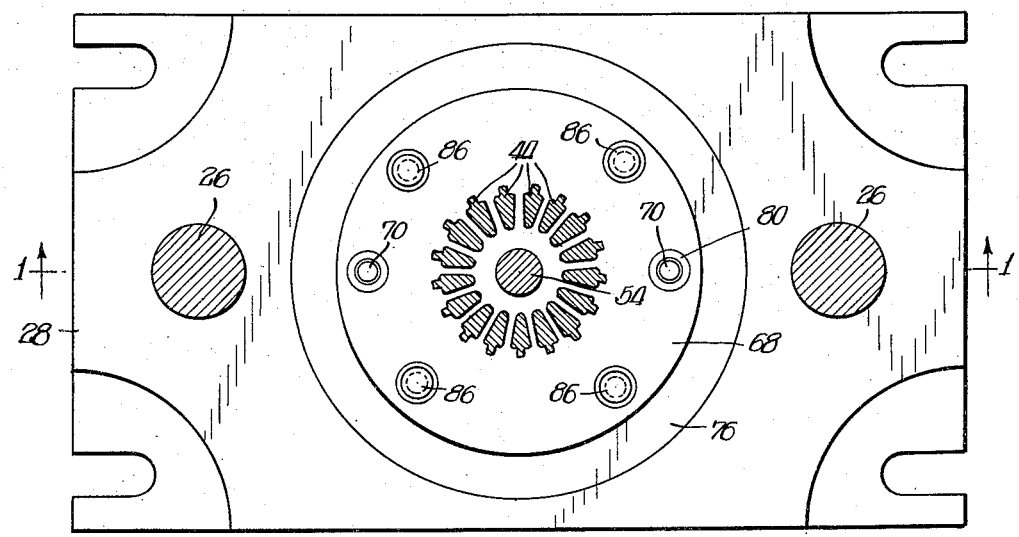
Figure 2 is a sectional top plan view of the lower portion of the die assembly illustrated in Figure 1, the section being taken substantially in the plane as indicated by the line 2—2 of Figure 1.

Referring first of all to the die assembly illustrated in Figures 1 to 3, inclusive, and parts thereof illustrated in Figures 4 to 12, inclusive, said die assembly consists essentially of the punch holder or top shoe 20, preferably of soft material such as low carbon steel, said punch holder being provided with suitable securing means 22 as desired, for securing said punch holder in a press or the like. Said punch holder is provided with spaced bushings 24, preferably of hard material, such as tool steel, slidably receiving guide pins 26, preferably of hard material, such as tool steel, which are fixedly secured to the die holder or bottom shoe 28, preferably of soft material such as low carbon steel.

A punch back-up plate 30, preferably of hard material such as tool steel, is interposed between the punch holder 20 and the laminated punch pad or spider 32, preferably of hard material such as tool steel, the back-up plate and spider being held in position with respect to the punch holder by means of spaced bolts 34. The head of each of the bolts 34 is received in a suitable recess 36 provided in punch holder 20, the threaded shank being received in a bushing 38 disposed in spider 32, and spaced positioning pins or dowels 40 extend through a bushing 41 of the punch holder and through back-up plate serving to position the spider with respect to the punch holder.

In the embodiment illustrated, the punches are constructed and arranged for forming a rotor of a motor and are suitably positioned with respect to the spider for punching the desired passageways which form the winding openings and shaft aperture in plate 42 which is of suitable material. It is, of course, understood that the shape and arrangement of punches and die parts depends on the particular device to be formed. The winding openings are formed by the punches 44, which are secured to the back-up plate 30 in a floating manner, in which case securing means such as the bolts 46 is disposed in a recess 48 in the back-up plate, the bolts being shouldered as at 50 and secured as at 52 in top of punches 44. There is a slight clearance between the shank of bolt 46 and the back-up plate, and also a slight clearance between the punches 44 and the spider, the spider apertures through which the punches extend substantially conforming to the shape of said punches.

Shaft hole punch 54 is likewise floatably mounted between back-up plate 30 and spider 32, being provided with a collar or head 56 received in the recess 58 provided in the top of the spider adjacent to back-up plate 32, recess 58 being slightly larger than head 56 to permit slight relative movement between the punch and spider. It is, of course, understood that floating means such as bolts 46 may be used to secure the central shaft hold punch 54 with respect to the back-up plate and the spider.

Punches 44 and 54 are of the desired shape and may either be solid punches or laminated, such as shown in Figures 8, 9 and 10. When said punches are laminated, they are made of segments 60, all being secured together by brazing and heat treated, as will later be more specifically described. Where the punch is a lamination, the adjacent members to be assembled to form the punch are provided with male and female members 62 and 64 (Figure 9) so formed that said members 62 and 64 in adjacent segments interfit. The completed punch is provided with securing means 66 for the bolts 46, or a certain lamination or certain laminations adjacent the top of the punch may be formed as a head similar to head 56.

The punches are piloted with respect to work 42 by means of the stripper plate 68, also shown as a lamination, the stripper plate being preferably of hard material such as tool steel. The stripper plate 68 is positioned by means of spaced dowels or positioning pins 70 and a filler block or spacer 72 is interposed between the stripper plate and die 74, said die being formed of laminations and being supported on die back-up plate 76 disposed in a suitable recess 78 provided in the die holder 28. The positioning pins 70 extend through a suitable bushing 80 provided in the spider and a suitable bushing 82 extending through the die 74 and back-up plate 76, and said pins are received in a suitable passageway 84 provided in the die holder 28.

In order to secure the lower die assembly consisting of the stripper 68, die 74, and die back-up plate 76, to die holder 28, headed bolts 86 extend through a bushing 88 disposed in the stripper, the heads of said bolts being suitably recessed in said bushing 88 and threaded to the bushings 90, extending through the die and back-up plate. Similarly, headed securing bolts 92 extend upwardly through the die holder 28, the heads of said bolts being suitably recessed in the die holder and the shanks of said bolts being threaded into bushings 90. Stripper 68, die 74 and back-up plate 76 are preferably of hard material such as tool steel, and filler block 72 is of suitable material to properly space the stripper plate from the die whereby the work 42, which in the embodiment shown, is a plate, can be properly received within the recess 77 formed by the filler block between the stripper and the die. The plate is suitably positioned by mechanism, not shown, between the stripper and die, so that plate 42 is in position for punching, the positioning mechanism (not shown) thereafter releasing the formed blank so that it may be discharged from the die and a new blank received in the die.

In operation of the punch mechanism illustrated in Figures 1 to 3, inclusive, a blank 42 is supplied to recess 77 between the stripper and die, being positioned therein for punching. Punches 44 and 54 are in raised position with respect to the die so that recess 77 is open, but the punches are in position to be guided by the stripper when the punch holder is moved downwardly by suitable mechanism, which movement causes punching operation. The punches are piloted by the stripper, the permitted slight floating movement between the punches and punch holder compensating for any slight misalignment between the die assembly parts and the press. Slugs 94 and 96 punched from plate 42 by the punches move downwardly through the guideways 98 and 100 of the die, and through guideways 102 and 104 of the back-up plate 76, and through passageway 106 of the die holder 28. After the punching operation the punch holder is moved upwardly causing punches 44 and 54 to move away from the punched plate 42, after which the positioning mechanism expels punched blank 42 and receives and positions a new blank 42 for its punching operation.

The laminations forming the spider, stripper, die and die back-up plate are dowelled by pins 108 eventually forming bushings 38, 80, 82 and 90. The laminations forming these members are formed with the punch apertures being suitably formed as by a blanking and subsequently shaving operation and are matched or aligned by the pins 108. The laminations are suitably coated as with commercially pure copper, eutectic alloys or other brazing or welding material, and in the assembly illustrated in Figure 11, suitable spacers 116 and 118 are interposed between the spider and stripper, between the stripper and die, said spacers being unprepared for brazing and being preferably of a soft material such as low carbon steel, or said spacers may be prepared for brazing, if desired. The assembly of parts illustrated in Figure 11 is then held in position in a fixture as illustrated in Figure 13 and are brazed and heat treated, it being noted that the grain of the material of the adjacent laminations preferably may not be in registry. Said fixture illustrated in Figure 13 consists essentially of a bottom supporting or base plate 120 provided with the upstanding guide bolts 122 secured to said base plate 120 and to the upper frame member 124. A relatively movable clamping member 126 is guided by the bolts 122 and is movable with respect to base 120, said member 126 being provided with upwardly extending operating rods 128 extending through suitable passageways 130 provided in member 124 and being engaged by the cross head 132. The cross head is suitably mounted on the guide rod 134 which extends upwardly from member 124 and is provided with the spring seat 136 adapted to be positioned by means of nut 138. The spring 140 is interposed between spring seat 136 and cross head 132, whereby the spring can be suitably compressed urging member 126 toward base plate 120. The assembly then shown in Figure 11 can be disposed between the base 120 and member 126 for immersion into the brazing bath or medium. Members 120, 122, 126 and 128 are preferably of heat resisting non-deforming material such as chrome nickel alloy steel.

In the brazing and heat treating steps the assembly illustrated in Figure 11 is preheated in one or more steps to gradually raise the temperature of the assembly to preferably just below brazing temperature, the brazing material being chosen so that its brazing temperature is just below the critical temperature of the material of the parts to be brazed. It is then heated to a temperature sufficiently above the critical temperature of the material of the parts to be brazed, so that proper ultimate heat treatment will be effected, and during this heating the brazing takes place. It will be seen that by selecting a brazing material which has a brazing temperature just below the critical temperature of the material to be brazed enables the assemblies to be fused as units upon cooling below the brazing temperature. The assembly is then cooled to room temperature through one or more steps as through quenching or air cooling. After cooling to room temperature, the assembly is given one or more draws. It is understood that the time element for performing the above steps, as well as the number of steps and effecting the necessary temperature, is such as to ultimately attain the desired heat treatment. The assembly is then ready for separation.

The spider and the stripper are now separated from the die and die back-up by cutting through pins 108 and spacers 116 and 118. The portions of pins 108 remaining in the spider and stripper are then tapped to form the bushings 38, 80 and 88 and the portions of pins 108 remaining in the die and back-up plate are tapped to form bushings 82 and 90. Certain of the bushings in the spider, stripper, die and die back-up are drilled and reamed for reception of dowels or pins 40 and 70, and the punch apertures 110 and 112 are honed or lapped. The parts are then ready for assembling in the die assembly illustrated in Figures 1 to 3, inclusive, after which they are ready for use.

The laminated punch illustrated in Figures 8 to 10 inclusive is treated in the same manner as described with respect to the parts illustrated in Figure 11.

Figure 14:
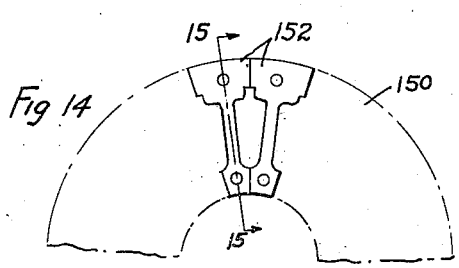
Figure 14 is a fragmentary plan view of a segmental die wherein the segments are formed of laminations.
Figure 15:
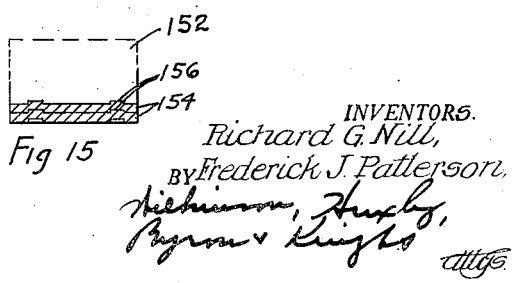
Figure 15 is a sectional of a die segment illustrated in Figure 14, the same being taken substantially in the plane as indicated by the line 15—15 of Figure 14.

In Figures 14 and 15 there is shown a segmental die 150 wherein the segments 152 are made of mated laminations 154 of suitable material. The adjacent laminations are provided with complementary positioning means 156, similar to those shown on the punch laminations illustrated in Figure 10, the laminations being secured together by brazing and heat treating as described with respect to the other modifications.

It is understood that where the word "brazing" is used this covers welding, and it is further understood that this application is not to be limited by the exact embodiments of devices shown and described as various other modifications in the devices and method will be readily apparent to those skilled in the art, the devices and method herein being only limited by the scope of the claims appended hereto.

We claim:

1. A die member comprising suitably shaped, juxtaposed laminations, integrally connected by brazing means, said laminations being positioned prior to brazing, by members formed into part of the die member after brazing.

2. A die member comprising suitably shaped, juxtaposed laminations, integrally connected by brazing means disposed between adjacent laminations, said laminations being positioned prior to brazing, by members formed into part of the die member after brazing.

3. A die member comprising suitably shaped, juxtaposed laminations integrally connected by brazing means, said die member being heat treated, said laminations being positioned prior to brazing, by members formed into part of the die members after brazing.

4. A die member comprising suitably shaped, juxtaposed laminations integrally connected by brazing means disposed between adjacent laminations, said die being heat treated, said laminations being positioned priod to brazing, by members formed into part of the die member after brazing.

5. The method of forming parts of a die assembly which include spider, stripper, die and die back-up plate, the method including assembling laminations prepared for brazing, doweling said laminations, subjecting said assembly to brazing and heat treating, separating said spider and stripper, drilling and reaming certain of the remaining dowels and threading certain other of the remaining dowels.

6. The method of forming parts of a die assembly which include spider, stripper, die and die back-up plate, the method including assembling laminations prepared for brazing, the brazing material having a brazing temperature less than the critical temperature of the material of the laminations, doweling said laminations, subjecting said assembly to heat treatment which includes bringing the assembly to a temperature below the brazing temperature through at least one heating step, then subjecting the assembly to a heat above said critical temperature, cooling said assembly to room temperature through one or more steps, and subjecting the assembly to at least one draw, the time and temperature for performing the steps of the heat treatment being such as to attain the desired ultimate heat treatment, separating said spider and stripper, drilling and reaming certain of the remaining dowels and threading certain other of the remaining dowels, and honing or lapping punch apertures.

7. A die assembly comprising top and bottom shoes, guide means between said shoes whereby said shoes are relatively movable in a predetermined manner, said top shoe having punch back-up plate and a spider secured thereto, floating punches mounted for lateral movement with respect to said spider, said bottom shoe having die back-up thereon, a die supported by said die back-up, and a stripper supported on but spaced from said die to form a work receiving recess, said die back-up, die and stripper being secured to said bottom shoe, said punches being guided by said stripper and being adapted in inoperative position to be above said recess and when operated to move through said recess, through work in said recess and into punch opening in said die, said die back-up and said bottom shoe having openings for passage of slugs, said die being formed of laminations, brazed and heat treated.

8. A punch comprising mated laminations, said mated laminations comprising adjacent laminations having interfitting male and female parts, said laminations being brazed together and heat treated.

9. A die comprising suitably shaped, juxtaposed laminations integrally connected by brazing means, said laminations being positioned prior to brazing, by members formed into part of the die after brazing.

10. A spider for a die assembly comprising suitably shaped, juxtaposed laminations integrally connected by brazing means.

11. A stripper for a die assembly comprising suitably shaped, juxtaposed laminations integrally connected by brazing means.

12. A die back-up for a die assembly comprising suitably shaped, juxtaposed laminations integrally connected by brazing means.

13. A die assembly comprising top and bottom shoes, guide means between said shoes whereby said shoes are relatively movable in a predetermined manner, said top shoe having punch back-up plate and a spider secured thereto, floating punches mounted for lateral movement with respect to said spider, said bottom shoe having die back-up thereon, a die supported by said die back-up and a stripper supported on but spaced from said die to form a work receiving recess, said die back-up, die and stripper being secured to said bottom shoe, said punches being guided by said stripper and being adapted in inoperative position to be above said recess and when operated to move through said recess, through work in said recess and into punch opening in said die, said die back-up and said bottom shoe having openings for passage of slugs, said spider being formed of laminations, brazed and heat treated.

14. A die assembly comprising top and bottom shoes, guide means between said shoes whereby said shoes are relatively movable in a predetermined manner, said top shoe having punch back-up plate and a spider secured thereto, floating punches mounted for lateral movement with respect to said spider, said bottom shoe having die back-up thereon, a die supported by said die back-up, and a stripper supported on but spaced from said die to form a work receiving recess, said die back-up, die and stripper being secured to said bottom shoe, said punches being guided by said stripper and being adapted in inoperative position to be above said recess and when operated to move through said recess, through work in said recess and into punch opening in said die, said die back-up and said bottom shoe having openings for passage of slugs, said stripper being formed of laminations, brazed and heat treated.

15. A die assembly comprising top and bottom shoes, guide means between said shoes whereby said shoes are relatively movable in a predetermined manner, said top shoe having punch back-up plate and a spider secured thereto, floating punches mounted for lateral movement with respect to said spider, said bottom shoe having die back-up thereon, a die supported by said die back-up, and a stripper supported on but spaced from said die to form a work receiving recess, said die back-up, die and stripper being secured to said bottom shoe, said punches being guided by said stripper and being adapted in inoperative position to be above said recess and when operated to move through said recess, through work in said recess and into punch opening in said die, said die back-up and said bottom shoe having openings for passage of slugs, said die back-up being formed of laminations, brazed and heat treated.

16. A die assembly comprising top and bottom shoes, guide means between said shoes whereby said shoes are relatively movable in a predetermined manner, said top shoe having punch back-up plate and a spider secured thereto, floating punches mounted for lateral movement with respect to said spider, said bottom shoe having die back-up thereon, a die supported by said die back-up, and a stripper supported on but spaced from said die to form a work receiving recess, said die back-up, die and stripper being secured to said bottom shoe, said punches being guided by said stripper and being adapted in inoperative position to be above said recess and when operated to move through said recess, through work in said recess and into punch opening in said die, said die back-up and said bottom shoe having openings for passage of slugs, said spider, stripper, die and die back-up being formed of laminations, brazed and heat treated.

17. A die assembly comprising top and bottom shoes, guide means between said shoes whereby said shoes are relatively movable in a predetermined manner, said top shoe having punch back-up plate and a spider secured thereto, floating punches mounted for lateral movement with respect to said spider, said bottom shoe having die back-up thereon, a die supported by said die back-up, and a stripper supported on but spaced from said die to form a work receiving recess, said die back-up, die and stripper being secured to said bottom shoe, said punches being guided by said stripper and being adapted in inoperative position to be above said recess and when operated to move through said recess, through work in said recess and into punch opening in said die, said die back-up and said bottom shoe having openings for passages of slugs, said punches being formed of laminations, brazed and heat treated.

18. A die assembly comprising top and bottom shoes, guide means between said shoes whereby said shoes are relatively movable in a predetermined manner, said top shoe having punch back-up plate and a spider secured thereto, floating punches mounted for lateral movement with respect to said spider, said bottom shoe having die back-up thereon, a die supported by said die back-up, and a stripper supported on but spaced from said die to form a work receiving recess, said die back-up, die and stripper being secured to said bottom shoe, said punches being guided by said stripper and being adapted in inoperative position to be above said recess and when operated to move through said recess, through work in said recess and into punch opening in said die, said die back-up and said bottom shoe having openings for passage of slugs, said spider, stripper, die and die back-up and said punches being formed of laminations, brazed and heat treated.

19. A die segment comprising suitably shaped, juxtaposed, mated laminations, the adjacent of said mated laminations having interfitting male and female parts, said laminations being integrally connected by brazing means.

20. A die segment comprising suitably shaped, juxtaposed, mated laminations, the adjacent of said mated laminations having interfitting male and female parts, said laminations being integrally connected by brazing means, disposed between said laminations, said segments being heat treated.

21. A die assembly comprising top and bottom shoes, guide means between said shoes whereby said shoes are relatively movable in a predetermined manner, said top shoe having punch back-up plate and a spider secured thereto, a punch carried by said back-up plate, said bottom shoe having die back-up thereon, a die supported by said back-up, and a stripper supported on but spaced from said die to form a work receiving recess, said die back-up, die and stripper being secured to said bottom shoe, said punch being adapted to pass through said stripper and being adapted in inoperative position to be above said recess and when operated to move through said recess, through work in said recess and into punch opening in said die, said die back-up and said bottom shoe having openings for passage of slugs, said die being formed of laminations, brazed and heat treated.

22. A die assembly comprising top and bottom shoes, guide means between said shoes whereby said shoes are relatively movable in a predetermined manner, said top shoe having punch back-up plate and a spider secured thereto, a punch carried by said back-up plate, said bottom shoe having die back-up thereon, a die supported by said die back-up, and a stripper supported on but spaced from said die to form a work receiving recess, said die back-up, die and stripper being secured to said bottom shoe, said punch being adapted to pass through said stripper, said spider being formed of laminations, brazed together.

23. A die assembly comprising top and bottom shoes, guide means between said shoes whereby said shoes are relatively movable in a predetermined manner, said top shoe having punch back-up plate and said spider secured thereto, a punch carried by said back-up plate, said bottom shoe having die back-up thereon, a die supported by said die back-up, and a stripper supported on but spaced from said die to form a work receiving recess, said die back-up, die and stripper being secured to said bottom shoe, said punch being adapted to pass through said stripper, said stripper being formed of laminations, brazed together.

24. A die assembly comprising top and bottom shoes, guide means between said shoes whereby said shoes are relatively movable in a predetermined manner, said top shoe having punch back-up plate and a spider secured thereto, a punch carried by said back-up plate, said bottom shoe having die back-up thereon, a die supported by said die back-up, and a stripper supported on but spaced from said die to form a work receiving recess, said die back-up, die and stripper being secured to said bottom shoe, said punch being adapted to pass through said stripper, said die back-up being formed of laminations, brazed together.

25. A die assembly comprising top and bottom shoes, guide means between said shoes whereby said shoes are relatively movable in a predetermined manner, said top shoe having punch back-up plate and a spider secured thereto, a punch carried by said back-up plate, said bottom shoe having die back-up thereon, a die supported by said die back-up, and a stripper supported on but spaced from said die to form a work receiving recess, said die back-up, die and stripper being secured to said bottom shoe, said punch being adapted to pass through said stripper, said spider, stripper, die and die back-up being formed of laminations, brazed and heat treated, said spider, stripper, die and die back-up each being separately formed of laminations, braced together.

26. A die assembly comprising top and bottom shoes, guide means between said shoes whereby said shoes are relatively movable in a predetermined manner, said top shoe having punch back-up plate and a spider secured thereto, a punch carried by said back-up plate, said bottom shoe having die back-up thereon, a die supported by said die back-up, and a stripper supported on but spaced from said die to form a work receiving recess, said die back-up, die and stripper being secured to said bottom shoe, said punch being adapted to pass through said stripper, said punches being formed of laminations, brazed together.

27. A die assembly comprising top and bottom shoes, guide means between said shoes whereby said shoes are relatively movable in a predetermined manner, said top shoe having punch back-up plate and a spider thereto, a punch carried by said back-up plate, said bottom shoe having die back-up thereon, a die supported by said die back-up, and a stripper supported on but spaced from said die to form a work receiving recess, said die back-up, die and stripper being secured to said bottom shoe, said punch being adapted to pass through said stripper, said spider, stripper, die and die back-up and said punches being formed of laminations, brazed and heat treated, said spider, stripper, die, die back-up and said punches each being separately formed of laminations, brazed together.

RICHARD G. NILL.
FREDERICK J. PATTERSON.

REFERENCES CITED

The following references are of record in the file of this patent:

UNITED STATES PATENTS

| Number | Name | Date |
|---|---|---|
| 612,922 | Bradley | Oct. 25, 1898 |
| 1,070,889 | Hartog | Aug. 19, 1913 |
| 1,533,236 | Dawson | Apr. 14, 1925 |
| 1,571,559 | Smith | Feb. 2, 1926 |
| 1,915,080 | Baumbach | June 20, 1933 |
| 2,108,253 | Dense | Feb. 15, 1938 |
| 2,163,229 | Knebel | June 20, 1939 |
| 2,186,799 | Boker | Jan. 9, 1940 |
| 2,196,902 | Jones | Apr. 9, 1940 |
| 2,325,617 | Lysholm | Aug. 3, 1943 |
| 2,379,003 | Hedberg | June 26, 1945 |

FOREIGN PATENTS

| Number | Country | Date |
|---|---|---|
| 13,194 | Great Britain | June 5, 1912 |
| 555,861 | France | Apr. 3, 1923 |

OTHER REFERENCES

Publication, An article entitled, "Aircraft Dies,"